Dec. 23, 1969          E. WEBSTER          3,485,418
MEANS FOR DELIVERING MEASURED QUANTITIES OF SEMILIQUID OR PASTY MATERIALS
Filed Feb. 19, 1968          3 Sheets-Sheet 2

INVENTOR
EDWARD WEBSTER

KEMON, PALMER, ESTABROOK
ATTORNEYS

Dec. 23, 1969  E. WEBSTER  3,485,418
MEANS FOR DELIVERING MEASURED QUANTITIES OF SEMILIQUID
OR PASTY MATERIALS
Filed Feb. 19, 1968  3 Sheets-Sheet 3

INVENTOR
EDWARD WEBSTER

KEMON, PALMER, ESTABROOK
ATTORNEYS

United States Patent Office 3,485,418
Patented Dec. 23, 1969

3,485,418
MEANS FOR DELIVERING MEASURED QUANTITIES OF SEMILIQUID OR PASTY MATERIALS
Edward Webster, Dorset, England, assignor to Edward Webster Limited, Bournemouth, Hampshire, England, a British company
Filed Feb. 19, 1968, Ser. No. 706,325
Claims priority, application Great Britain, Mar. 31, 1967, 14,814/67
Int. Cl. G01f *11/06, 11/36*
U.S. Cl. 222—309                                5 Claims

ABSTRACT OF THE DISCLOSURE

In apparatus for delivering measured quantities of semiliquid or pasty material, material is fed from a storage container under pressure to a metering cylinder of adjustable capacity from which it is discharged to a delivery nozzle by a power-operated piston working in the cylinder.

---

This invention relates to new or improved means for delivering quantities of semiliquid or pasty materials such, for example, as mascara and other cosmetic materials of similar consistency.

According to my invention apparatus for delivering measured quantities of such materials comprises a storage container in which a supply of material is maintained under pressure, a metering cylinder in communication with the storage container through a normally open inlet port in the cylinder wall, a piston working in the cylinder and actuated by double-acting power means, an axially adjustable end wall for the cylinder for varying the effective capacity of the cylinder, and a normally closed outlet port in the cylinder wall leading to a delivery nozzle and spaced axially from the inlet port, movement of the piston into the cylinder first closing the inlet port and then opening the outlet port and forcing through the outlet port to the delivery nozzle material which has been fed from the storage container into the space in the metering cylinder between the piston and the movable end wall.

The movable end wall is conveniently formed by a floating piston slidable on the piston rod of the main piston which extends axially through the cylinder, the floating piston being backed by a sleeve which extends axially from a member adjustably screwed on to the outer end of the piston rod, and passes through an end closure for the cylinder.

The assembly is preferably mounted on a stand at a convenient height for an operator who applies each case or container to be filled in turn to the delivery nozzle and controls by means of a pedal the double-acting power means for actuating the main piston in the metering cylinder. The power means is conveniently formed by a double-acting fluid pressure cylinder.

One practical form of apparatus in accordance with our invention is illustrated by way of example in the accompanying drawings in which.

Figure 1:
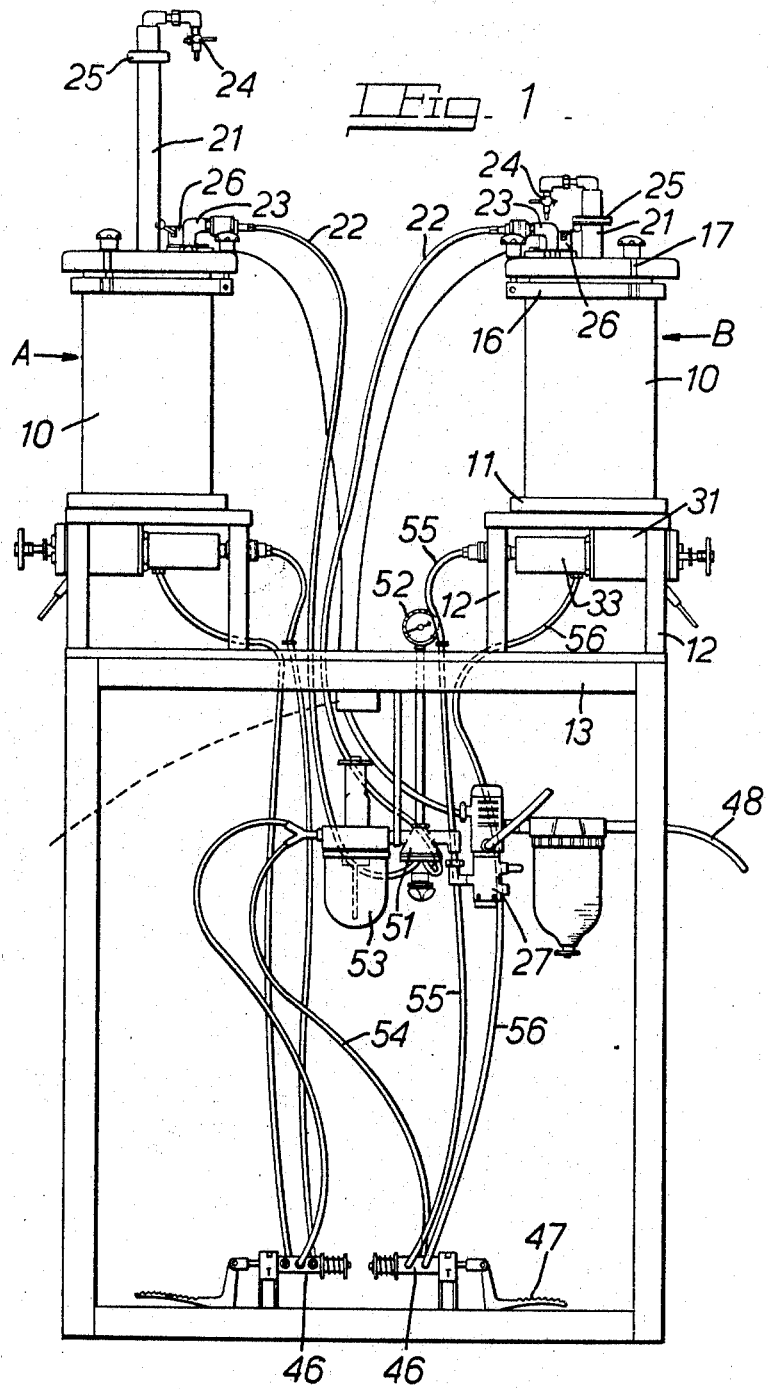
FIGURE 1 is a side elevation of a stand carrying two independently operable means for delivering measured quantities of mascara into containers.
Figure 2:
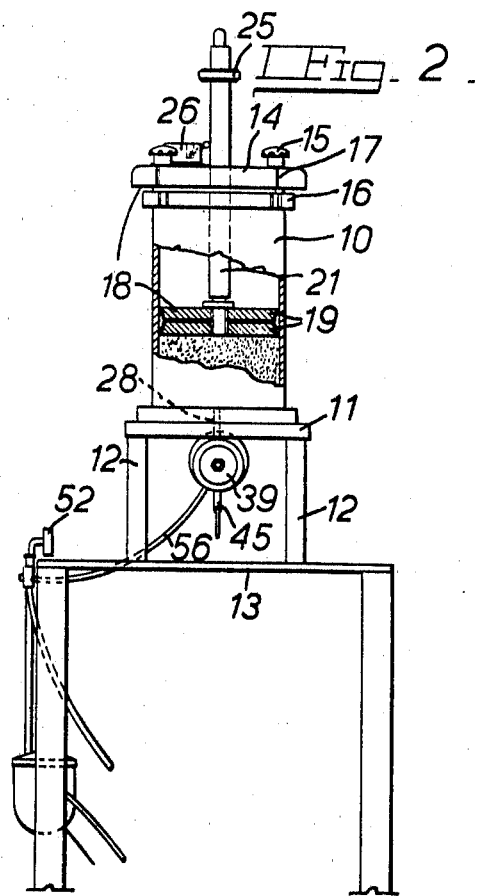
FIGURE 2 is a front elevation partly in section of one of the means shown in FIGURE 1.

In the apparatus shown in FIGURE 1 a stand carries two independently operable means A and B designed for use by two operators sitting on opposite sides of the stand.

As the two means are identical only one need be described.

Material to be dispensed, in this case mascara, is stored in a container 10 comprising a vertical cylinder of substantial capacity mounted on a platform 11 supported by pillars 12 from a table 13 forming part of a stand of a convenient height.

The upper end of the container is closed by a sealed cover 14 held in position by finger nuts 15 on angularly spaced captive bolts which are hinged to a flange 16 on the upper end of the container and are adapted to be swung up into radial notches 17 in the periphery of the cover.

A piston 18 provided with opposed cup washer seals 19 works in the container and is mounted on the lower end of a piston rod 21 which is carried up through a seal in the cover. A pipe-line 22 from a compressed air supply is connected to a union 23 on the cover to admit air to the container above the piston. An axial drilling in the piston rod (not shown) leads at its upper end to a bleeder tap 24.

To fill the container the cover 14 is removed, together with the piston 18, and the material to be dispensed is fed into the container. The piston and cover are replaced, compressed air is supplied through the union 23 on the cover to the space above the piston, and the bleeder tap 24 is opened for a moment or two for the discharge of any air trapped below the piston. The piston and piston rod are then in their highest position as shown on the left in FIGURE 1.

A collar 25 is mounted on the piston rod near its upper end and when the piston approaches the bottom of its stroke as shown on the right in FIGURE 1 and the container is nearly empty the collar engages a limit switch 26 which is mounted on the cover and which energizes a solenoid-operated valve 27 to cut off the supply of compressed air.

An outlet passage 28 from the bottom of the container leads into a port 29 located at an intermediate point in the length of a metering cylinder 31 mounted in a horizontal position below the platform 11. A main piston 32 working in one end of the metering cylinder is connected to and actuated by an axially aligned double-acting compressed air cylinder 33 seen in FIGURE 1. The piston, which is sealed by an O ring 34, is integral with or rigidly secured to a piston rod 35 which extends slidably through an axial bore in a floating or auxiliary piston 36 working in the metering cylinder and is carried through an opening in a closure plate 37 at the opposite end of the cylinder. The outer end of the piston rod is screw-threaded as shown at 38 and has screwed on to it an adjusting member 39.

The adjusting member comprises an external knurled head and an axially extending sleeve 41 fitting over the piston rod and providing an abutment or backing for the floating piston 36 which forms an axially adjustable end wall for the metering cylinder. The sleeve 41 is a clearance fit over the piston rod and a clearance fit in the opening in the closure plate 37 through which it passes. The floating piston 36 is provided with a cup seal 42 on its inner end, and an O ring 43 makes a sliding seal between the piston rod and the bore in the piston 36 through which it passes.

An outlet port 44 in the wall of the metering cylinder on its lower side leads to a delivery nozzle 45, the port 44 being spaced axially from the inlet port 29 by which material from the container enters the cylinder. The nozzle 45 is detachably screwed into a socket in the body of the metering cylinder so that it can be readily changed to suit the material which is being dispensed and the cases or containers which are to be filled.

The supply of compressed air to opposite ends of the double-acting fluid pressure cylinder 33 which actuates the main piston 32 in the metering cylinder is controlled by a spring-loaded two-way valve 46 actuated by a pedal 47.

Air from a compressed air supply line 48 is taken through a filter 49, the solenoid-operated valve 27, a pressure regulator 51 to which is connected a pressure gauge 52, and an air line lubricator 53 to a pipe 54 leading to the pedal-operated valve 46 from which it is delivered through pipes 55, 56 to either end of the cylinder 33 according to the positon of the pedal.

The air supply to the upper end of the storage container is taken directly from the pressure regulator 51 and is not affected by the pedal-operated valve.

Figure 3:
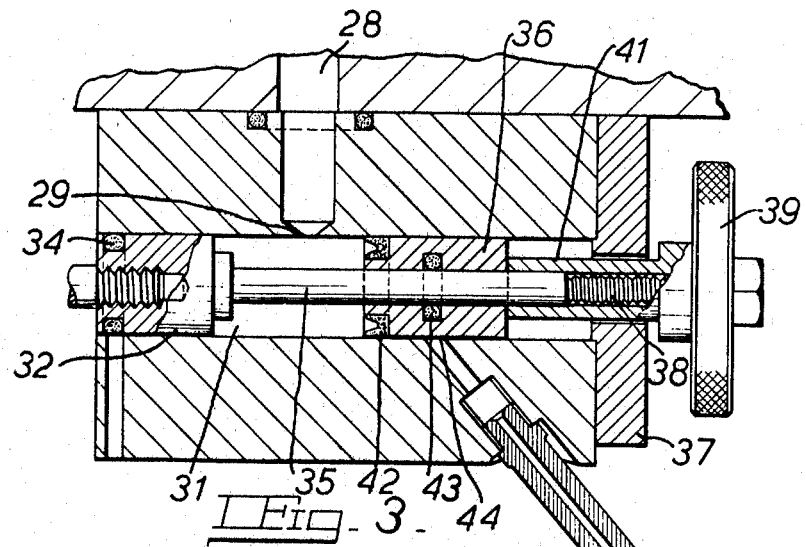
FIGURE 3 is a longitudinal section on a larger scale of the metering cylinder showing the movable parts in their normal rest position.

Before starting to fill cases or containers with mascara the adjusting member 39 is rotated to move the floating piston 36 inwardly to a position such that when the main piston is in the fully retracted position shown in FIGURE 3 the volume of the space in the metering cylinder between the pistons is equal to that of the material to be dispensed on each operation.

The inlet port 29 to the metering cylinder is open and the air pressure above the piston in the storage container forces material from that cylinder into the space between the pistons in the metering cylinder to fill that space.

The operator fits a container to be filled over the delivery nozzle 45 and depresses the pedal 47. This operates the valve 46 to admit air from the supply line to the outer end of the compressed air cylinder 33 which advances the main piston 32 into the metering cylinder. After that piston has moved through a short distance it closes the inlet port 29 and cuts off communication with the storage container.

Figure 4:
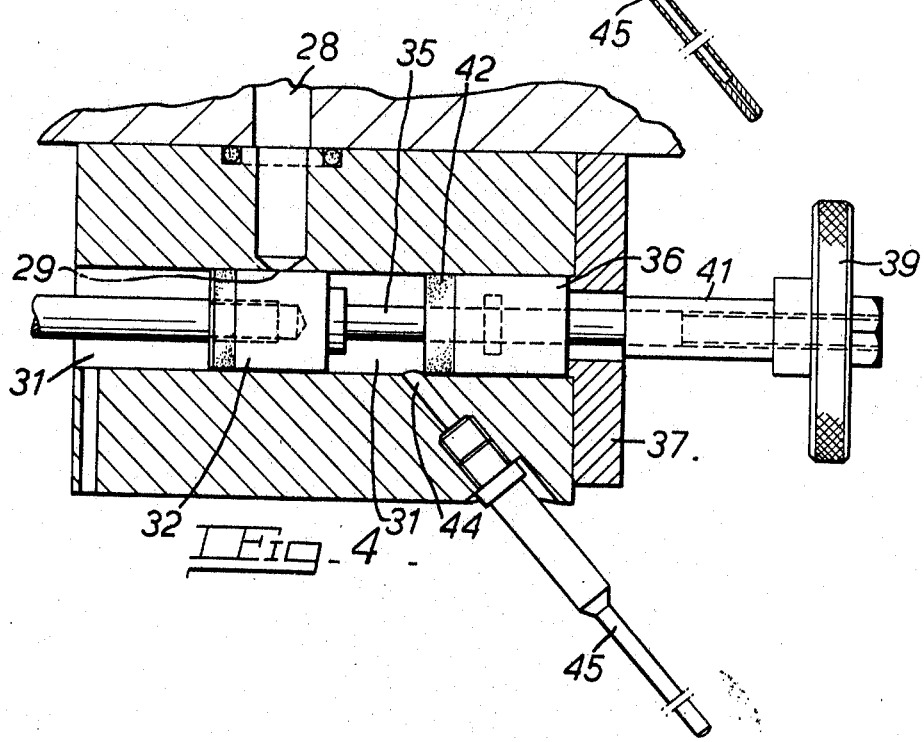
FIGURE 4 is a similar section showing the parts in the position they assume when the piston is being advanced into the metering cylinder and material is being delivered.

As the movement continues the sleeve 41 is carried outwardly with the piston rod 35 and the pressure exerted on the material between the pistons forces the floating piston 36 back until it abuts against the end closure 37 as shown in FIGURE 4. As it moves into that position the floating piston uncovers the outlet port 44 so that as the main piston completes its movement the material between the pistons is forced through the outlet port to the delivery nozzle over which the operator is holding a case or container.

On release of the pedal 47 the valve 46 controlling the compressed air cylinder is reversed and the two pistons in the metering cylinder are returned to their initial positions and further material is fed from the storage container into the space between them.

By this means containers for mascara or other material can be filled very rapidly and easily with accurately measured quantities of material, the quantity delivered on each operation of the pedal being readily adjustable to suit containers of any size within the maximum capacity of the metering cylinder.

I claim:

1. Apparatus for delivering measured quantities of a semiliquid or pasty material comprising a storage container in which a supply of material is held under pressure, a metering cylinder having a normally open inlet port in the cylinder wall in communication with the storage container, a piston rod extending axially through the metering cylinder, double-acting power means connected to one end of the piston rod for moving it axially, a main piston fixed on said piston rod within the cylinder, a floating piston slidably mounted on the piston rod, a backing member for said floating piston adjustably screwed on to the other end of said piston rod, a normally closed outlet port in the wall of the cylinder spaced axially from the inlet port, and a delivery nozzle in communication with the outlet port, the relative positions of the parts being such that in the normal fully retracted position of the piston rod the main piston is located at one end of the cylinder, the inlet port is open, and the outlet port is covered by the floating piston, and when the piston rod is advanced into the cylinder by the power-operated means the main piston first closes the inlet port, the floating piston then uncovers the outlet port, and the main piston forces through the outlet port to the delivery nozzle material which has been fed from the storage container into the space in the cylinder between the main piston and the floating piston.

2. Apparatus as in claim 1 wherein said backing member for the floating piston comprises a finger-nut adjustably screwed on to the piston rod outside the metering cylinder and a sleeve extending axially from the finger-nut through an opening in an end closure for the metering cylinder, said sleeve fitting freely over the piston rod and the floating piston being in sliding and sealing engagement with the piston rod within the cylinder.

3. Apparatus as in claim 1 wherein said double-acting power means for moving the piston rod axially comprises a double-acting compressed air motor controlled by a spring-loaded two-way valve operated by a pedal.

4. Apparatus as in claim 1 wherein said storage container comprises a vertical cylinder, and a piston working in the cylinder and mounted on the lower end of a piston rod extending upwardly through a sealed readily removable cover for the container, said cover carrying means for the connection to it of a pipe line supplying air under pressure whereby a substantially constant pressure is maintained on material in the container below the piston.

5. Apparatus as in claim 4 wherein said piston rod carries near its upper end a collar adapted, when the container is nearly empty, to engage a switch controlling a solenoid-operated valve in the air supply line by which the supply of air under pressure to the container is automatically cut off.

References Cited

UNITED STATES PATENTS

| 1,566,836 | 12/1925 | Darling | 222—309 |
| 2,464,030 | 3/1949 | Engstrom | 222—309 |
| 2,510,576 | 6/1950 | Herbold | 222—309 |
| 2,605,021 | 7/1952 | Churchill et al. | 222—309 X |

SAMUEL F. COLEMAN, Primary Examiner